US 9,331,832 B2

(12) United States Patent
Lindbom et al.

(10) Patent No.: US 9,331,832 B2
(45) Date of Patent: *May 3, 2016

(54) METHODS AND ARRANGEMENTS IN A WIRELESS COMMUNICATION SYSTEM

(71) Applicant: Telefonaktiebolaget L M Ericsson (publ), Stockholm (SE)

(72) Inventors: Lars Lindbom, Karlstad (SE); George Jöngren, Sundbyberg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 158 days.

This patent is subject to a terminal disclaimer.

(21) Appl. No.: 13/988,272

(22) PCT Filed: Nov. 13, 2012

(86) PCT No.: PCT/SE2012/051248
§ 371 (c)(1),
(2) Date: May 17, 2013

(87) PCT Pub. No.: WO2013/074026
PCT Pub. Date: May 23, 2013

(65) Prior Publication Data
US 2014/0086166 A1   Mar. 27, 2014

Related U.S. Application Data

(60) Provisional application No. 61/559,418, filed on Nov. 14, 2011.

(51) Int. Cl.
*H04L 5/00* (2006.01)
*H04W 52/16* (2009.01)
(Continued)

(52) U.S. Cl.
CPC ............... *H04L 5/005* (2013.01); *H04W 52/16* (2013.01); *H04W 52/146* (2013.01); *H04W 52/244* (2013.01); *Y02B 60/50* (2013.01)

(58) Field of Classification Search
CPC .... H04L 5/005; H04W 52/146; H04W 52/16; H04W 52/244; Y02B 60/50
USPC .......................................... 370/310, 328, 329
See application file for complete search history.

(56) References Cited

U.S. PATENT DOCUMENTS 8,599,798 B2 * 12/2013 Iochi et al. .................... 370/335
2003/0114181 A1 * 6/2003 Lee et al. ....................... 455/522
(Continued)

FOREIGN PATENT DOCUMENTS

WO    WO 2012/154094 A1    11/2012

OTHER PUBLICATIONS

International Search Report, Application No. PCT/SE2012/051248, Feb. 25, 2013.
(Continued)

*Primary Examiner* — Chi H Pham
*Assistant Examiner* — Robert Lopata
(74) *Attorney, Agent, or Firm* — Myers Bigel & Sibley, P.A.

(57) ABSTRACT

An object of some embodiments is to enable more dynamic and flexible transmission of reduced-power subframes. Particular embodiments provide a method in a network node. The method comprises transmitting a downlink scheduling assignment for a subframe to a wireless terminal. The scheduling assignment is comprised in control information. The control information further comprises an indication of a power offset that is or will be used for data transmission in the subframe relative to reference signal transmission.

19 Claims, 13 Drawing Sheets

(51) Int. Cl.
  *H04W 52/14* (2009.01)
  *H04W 52/24* (2009.01)

(56) References Cited

U.S. PATENT DOCUMENTS

| | | | |
|---|---|---|---|
| 2008/0045260 A1* | 2/2008 | Muharemovic et al. | 455/522 |
| 2009/0034481 A1* | 2/2009 | Kuroda et al. | 370/335 |
| 2009/0073904 A1* | 3/2009 | Ranta-aho et al. | 370/310 |
| 2009/0318183 A1 | 12/2009 | Hugl et al. | |
| 2010/0054358 A1* | 3/2010 | Ko et al. | 375/267 |
| 2010/0246561 A1 | 9/2010 | Shin et al. | |
| 2011/0002233 A1* | 1/2011 | Hammarwall et al. | 370/252 |
| 2011/0098054 A1* | 4/2011 | Gorokhov et al. | 455/452.1 |
| 2011/0098076 A1 | 4/2011 | Kim et al. | |
| 2011/0199945 A1 | 8/2011 | Chang et al. | |
| 2011/0250899 A1 | 10/2011 | Vajapeyam et al. | |
| 2011/0268072 A1* | 11/2011 | Lee et al. | 370/329 |
| 2012/0224555 A1* | 9/2012 | Lee et al. | 370/329 |
| 2012/0282864 A1* | 11/2012 | Dimou et al. | 455/67.14 |
| 2013/0078913 A1* | 3/2013 | Lee et al. | 455/39 |
| 2013/0121279 A1* | 5/2013 | Noh et al. | 370/329 |

OTHER PUBLICATIONS

Written Opinion of the International Searching Authority, Application No. PCT/SE2012/051248, Feb. 25, 2013.

3GPP, Technical Specification: 3$^{rd}$ Generation Partnership Project; Technical Specification Group Radio Access Network; Evolved Universal Terrestrial Radio Access (E-UTRA); Radio Resource Control (RRC); Protocol specification (Release 10), 3GPP TS 36.331 V10.30.0 (Sep. 2011), 296 pp.

3GPP, Technical Specification: 3$^{rd}$ Generation Partnership Project; Technical Specification Group Radio Access Network; Evolved Universal Terrestrial Radio Access (E-UTRA); Physical layer procedures (Release 10), 3GPP TS 36.213 V10.30.0 (Sep. 2011), 122 pp.

* cited by examiner

Figure 2: Resource element grid over an RB pair showing potential positions for Rel-9/10 UE specific RS, CSI-RS (marked with a number corresponding to the CSI-RS antenna port), and CRS.

METHODS AND ARRANGEMENTS IN A WIRELESS COMMUNICATION SYSTEM

CROSS REFERENCE TO RELATED APPLICATIONS

This application is a 35 U.S.C. §371 national stage application of PCT International Application No. PCT/SE2012/051248, filed on 13 Nov. 2012, which itself claims the benefit of U.S. provisional Patent Application No. 61/559,418, filed 14 Nov. 2011, the disclosures and contents of both of which are incorporated by reference herein in their entirety.

TECHNICAL FIELD

The present invention relates generally to methods and arrangements for transmitting and receiving data in a wireless communication system.

BACKGROUND

The 3rd Generation Partnership Project (3GPP) is responsible for the standardization of the Universal Mobile Telecommunication System (UMTS) and Long Term Evolution (LTE). The 3GPP work on LTE is also referred to as Evolved Universal Terrestrial Access Network (E-UTRAN). LTE is a technology for realizing high-speed packet-based communication that can reach high data rates both in the downlink and in the uplink, and is thought of as a next generation mobile communication system relative to UMTS.

In LTE, OFDM (Orthogonal Frequency Division Multiplexing) is used in the downlink. The LTE physical resource can be seen as a time-frequency grid, where each resource element, i.e. each square in the grid, corresponds to one OFDM subcarrier during one OFDM symbol interval. An LTE downlink subframe comprising 14 OFDM symbols (in case of normal cyclic prefix), with 3 OFDM symbols as control region, is illustrated in FIG. 1. Resource allocation in LTE is described in terms of resource blocks (RBs), and a subframe comprises a resource block pair, i.e. two time-consecutive resource blocks. The control region of a subframe comprises e.g. the Physical Downlink Control Channel (PDCCH), on which control information such as downlink scheduling assignments and uplink scheduling grants are transmitted. In the data region, data is transmitted on the Physical Downlink Shared Channel (PDSCH).

Some of the resource elements within the time-frequency grid are used to transmit reference symbols (RS), which are known symbols which may e.g. be used by the receiver for channel estimation in order to perform coherent demodulation. In LTE, cell specific reference symbols (CRS) are transmitted in all downlink subframes. They are also used for mobility measurements and for uplink power control performed by the UEs. Since the CRS is common to all UEs in the cell, the transmission of CRS cannot be easily adapted to suit the needs of a particular UE. As of LTE Release-10, a new RS concept was introduced with separate UE-specific RS for demodulation of PDSCH and separate RS for measuring the channel for the purpose of channel state information (CSI) feedback from the UE. The latter is referred to as CSI-RS. CSI-RS are not transmitted in every subframe, and they are generally sparser in time and frequency than RS used for demodulation. CSI-RS transmissions may occur every $5^{th}$, $10^{th}$, $20^{th}$, $40^{th}$, or $80^{th}$ subframe according to an RRC configured periodicity parameter and an RRC configured subframe offset.

A detailed illustration of which resource elements within a resource block pair that may potentially be occupied by the new UE specific RS and CSI-RS is provided in FIG. 2.

There is an ever increasing demand for higher data rates in wireless networks, which poses challenges to developers of such networks. One approach to meeting requirements for higher data rates is to deploy heterogeneous networks (HetNets), i.e. a network containing nodes, e.g. base stations, operating with different transmission power. Base stations operating with high transmission power are herein denoted macro base stations, and base stations operating with lower transmission power are denoted low power nodes (LPN), but may also be referred to by other terms such as micro, pico, or femto base stations. The LPNs may further be stand-alone base stations, relays, or remote radio units (RRUs), also referred to as remote radio heads (RRHs).

Cell selection by wireless terminals is typically based on downlink (DL) received power, including the effects of the different base station transmission power. This leads to an 'imbalance area' surrounding the low power node where the path loss is lower towards the low power node, but the macro base station is still selected due to its higher transmission power. In the uplink (UL) direction, where the transmit power is the same, it would be better for a wireless terminal to be connected to the low power node also in this area. By increasing transmission power of the lower power node, the cell size of low power nodes can be increased. However, doing so affects the cost and size of the node, which in turn limits site availability. The range of the low power node can also be expanded by using a cell selection offset that favors the selection of the low power node. This leads to the UL signal being received in the best node, i.e. the low power node, and offloads the macro to a greater extent. These benefits, however, come at the cost of higher DL interference from the macro base station for users on the edge of the low power node cell.

Thus, solutions for inter-cell interference coordination (ICIC) are particularly important in heterogeneous networks. One approach is to separate transmissions from the macro layer and the pico layer in time, sometimes referred to as time-domain ICIC. This may be achieved by silencing the interfering macro base station in certain subframes. LTE Release 10 introduced Almost Blank Subframes (ABS), which are subframes with reduced transmit power (including no transmission) on some physical channels and/or reduced activity. The eNB may still transmit necessary control channels and physical signals as well as system information in the ABS, in order to ensure backwards compatibility toward UEs. Alternatively, the need to transmit these signals in ABS may be avoided by careful selection of ABS patterns.

Patterns based on ABSs may be signalled to the UE to restrict the UE measurement to specific subframes, called measurement resource restrictions. There are different patterns depending on the type of measured cell (serving or neighbour cell) and measurement type (e.g. RRM, RLM). One kind of pattern provides resource restrictions for CSI measurements of a primary cell (PCell). When this pattern is configured, two subframe subsets are configured per UE, and the UE reports CSI for each configured subframe subset. Typically, the two subframe subsets are chosen with the expectation that CSI measurements using the two configured subframe subsets are subject to different levels of interference. For example, one subframe subset may indicate ABSs while the second subframe subset indicates non-ABSs. For periodic CSI reports, linkage of each CSI report to a configured subset of subframes is defined in 3GPP TS 36.331, v.10.3.1. For aperiodic CSI reports, the UE reports CSI based on the subframe subset containing the CSI reference resource.

Procedures for CSI reporting are described in 3GPP TS 36.213, v10.3.0, in particular in sections 7.1.2 and 7.1.3.

When transmitting data in Almost Blank Subframes, the general understanding has been that the network node should use zero power, i.e. "no transmission". However, the reduced transmission time degrades performance for users connected to the macro base station, and leads to lower data rates. System performance evaluations have recently shown that reduced, but non-zero, power on data transmissions in ABS could provide significant performance improvements over zero-power transmissions, in particular for unicast transmissions, i.e. transmissions directed to a single user.

By transmitting unicast PDCCH and corresponding PDSCH or Physical HARQ Indicator Channel (PHICH) with reduced power in ABS, the flexibility of the macro scheduler may increase significantly. For example, macro users with good radio coverage could also be scheduled in ABS, but with reduced power data transmissions, and thus release resources/capacity for coverage limited macro users that would need the high power downlink subframes to receive data with an acceptable throughput. Another example is the possibility to transmit grants in ABS to enable uplink transmissions for macro users closer to the macro eNB which otherwise would be restricted to receive grants in non-ABS only. As these users are likely operating rather close to the macro eNB, the uplink interference towards pico eNBs would be limited. The reduction of the transmit power on unicast data physical channels in ABS would typically be in the order of magnitude of the largest configured cell selection offset within the macro coverage area.

In order to demodulate data transmissions based on higher order modulation schemes as well as deriving CSI feedback correctly, the transmit power differences between resources carrying PDSCH and reference signals need to be known by the UE. Therefore, the differences of the PDSCH transmitted energy per resource element (EPRE) to CRS EPRE and of PDSCH EPRE to CSI-RS EPRE can be derived by the UE from parameters provided by higher layer signaling, in which a UE may assume the EPRE of the reference signals to be constant across the downlink system bandwidth and constant across all subframes. In current specifications, these signaled power differences are assumed to be valid for all subframes, which clearly would not be applicable in the case of reduced power on data transmissions in ABS. Hence, in order to support reduced power on unicast physical channels in ABS the UE needs to be able to derive transmit power offsets between PDSCH and CRS/CSI-RS that are valid in certain subframes only, as illustrated in FIG. 3.

It has therefore been proposed in 3GPP to add additional signaling for supporting different unicast data transmit power offsets of PDSCH with respect to CRS/CSI-RS in ABS and non-ABS subframes, respectively.

Coordinated multi-point (CoMP) transmission and reception is being considered for LTE-Advanced Rel. 11 as a tool to improve the coverage of high data rates, the cell-edge throughput, and also to increase system throughput. CoMP implies dynamic coordination among multiple geographically separated transmission and/or reception points, where a "point" refers to a set of geographically co-located antennas. FIG. 4 shows an example CoMP heterogeneous network scenario with a macro base station equipped with low-power remote radio heads (RRHs) forming pico cells. The transmission/reception points created by the RRHs have different cell IDs than the macro cell. Typically, the RRHs will be connected to the macro base station via fiber or other fast backhaul connection in order to enable the coordination of transmission and reception.

There is room for further enhancements with respect to the transmission of reduced-power subframes, in particular when network deployments such as the one illustrated in FIG. 4 are considered.

SUMMARY

An object of some embodiments is to enable more dynamic and flexible transmission of reduced-power subframes.

Particular embodiments provide a method in a network node. The method comprises transmitting a downlink scheduling assignment for a subframe to a wireless terminal. The scheduling assignment is comprised in control information. The control information further comprises an indication of a power offset that is or will be used for data transmission in the subframe relative to reference signal transmission.

Other embodiments provide a method in a wireless terminal. The method comprises receiving a downlink assignment for a subframe. The downlink assignment is comprised in control information. The control information further comprises an indication of a transmit power offset that is or will be used for data in the subframe. The wireless terminal demodulates data received in the subframe by means of the indicated transmit power offset.

Particular embodiments provide a network node comprising radio circuitry and processing circuitry. The processing circuitry is configured to transmit, via the radio circuitry, a downlink scheduling assignment for a subframe to a wireless terminal. The scheduling assignment is comprised in control information. The processing circuitry is further configured to include in the control information an indication of a power offset that will be used for data transmission in the subframe relative to reference signal transmission. The network node may be realized as a base station, e.g. an eNB.

Yet further embodiments provide a wireless terminal comprising radio circuitry and processing circuitry. The processing circuitry is configured to receive, via the radio circuitry, a downlink assignment for a subframe. The downlink assignment is comprised in control information. The control information further comprises an indication of a transmit power offset that is or will be used for data in the subframe. The processing circuitry is further configured to demodulate data received in the subframe by means of the indicated transmit power offset. The wireless terminal may be realized as a user equipment (UE).

Modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

DETAILED DESCRIPTION

As mentioned above, significant improvement may be achieved by adding support for signaling of different transmit power offsets for ABS and non-ABS subframes respectively. In the following description, an ABS subframe where data is transmitted with reduced, but non-zero power will also be referred to as a reduced power subframe, or RPSF. Non-ABS subframes are alternatively referred to as "normal subframes" or "full power subframes".

A UE in process of demodulating received data first calculates a set of received signal data hypotheses by multiplying the estimated radio channel with possible transmitted symbols corresponding to the modulation scheme used for the transmission. The UE then detects the received symbol by comparing the received data signal with each received data signal hypothesis and selects the hypothesis which is closest in Euclidean distance to the received data signal.

Figure 16:
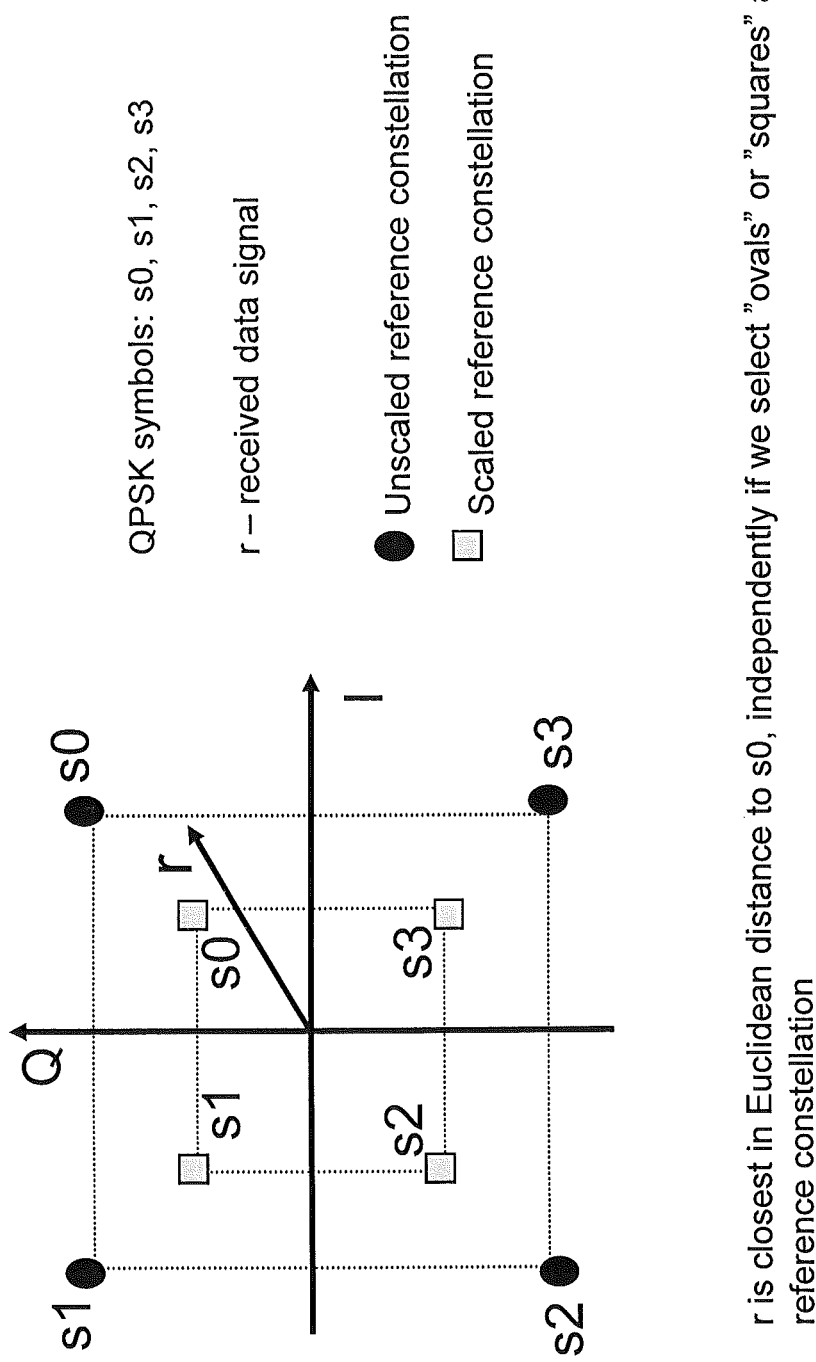
FIG. 16 is a schematic drawing illustrating scaling of reference signals
Figure 17:
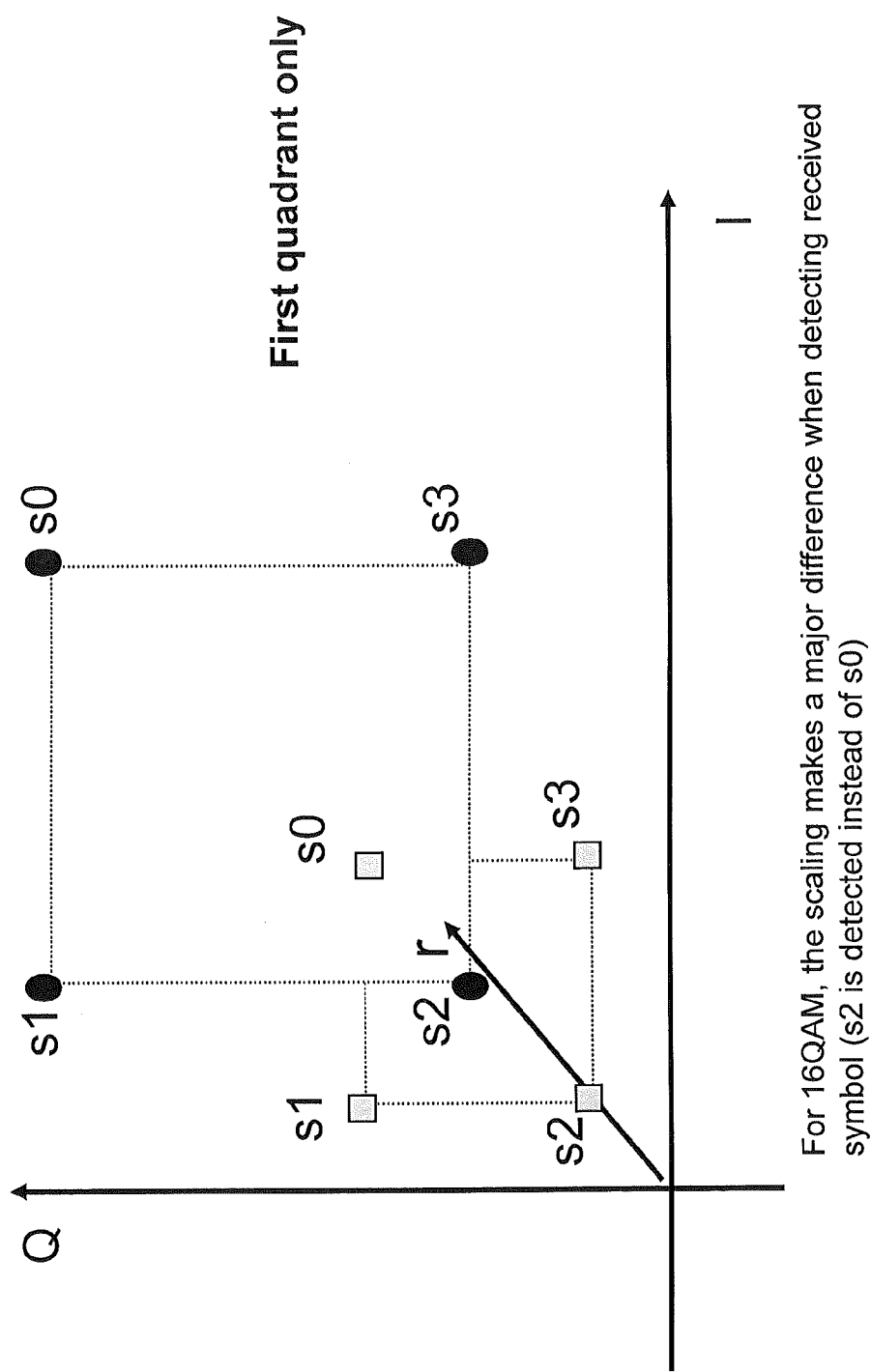
FIG. 17 is a schematic drawing illustrating scaling of reference signals

A UE estimates the radio channel from received downlink reference symbols, either CRS or DM-RS depending on the used transmission mode. When the transmit power used on the reference signals differs significantly from the transmit power used on data, the channel estimate is scaled to the power level of the data. This power scaling is only necessary when higher order modulation schemes are used, i.e. modulation schemes with more than four signal constellation points. In the case of QPSK modulation with four signal constellation points, the closest Euclidean distance between the received data signal and the four received data signal hypotheses will be independent of the scaling as illustrated in FIG. 16, where received data signal hypothesis "s0" is selected independently of whether the reference constellation has been scaled or not. As illustrated in FIG. 17 this will not be the case for 16QAM where scaling can highly impact the closest Euclidean distance between the received data signal and the received data signal hypotheses. Thus, for demodulation of PDSCH using higher order modulations, a UE needs to know the transmit power difference to the downlink reference signals used for channel estimation.

In order for a serving eNB to select a proper transmission mode and modulation coding schemes for PDSCH transmissions, a UE provides feedback by sending CSI reports to the serving eNB. The UE derives CSI by estimating the strength of the serving cell radio channel and to correctly report CSI the UE needs to take the transmit power differences between the downlink reference signals (CRS or CSI-RS) and the PDSCH into account. Thus, for providing accurate CSI feedback a UE needs to know the transmit power difference of PDSCH and the downlink reference signals used for CSI channel estimation.

A possible approach for enabling signaling of power offset information is by semi-statically configuring different transmit power offsets for normal subframes and RPSF subframes, for example using RRC signaling from the eNB to the UE. As explained earlier, the UE may be configured with two subframe patterns or subframe subsets, one for ABS and one for non-ABS subframes. The UE would then be able to assume that a first power offset had been used for all subframes included in the ABS subset, and that a second power offset had been used for all subframes in the non-ABS subset.

Figure 1:
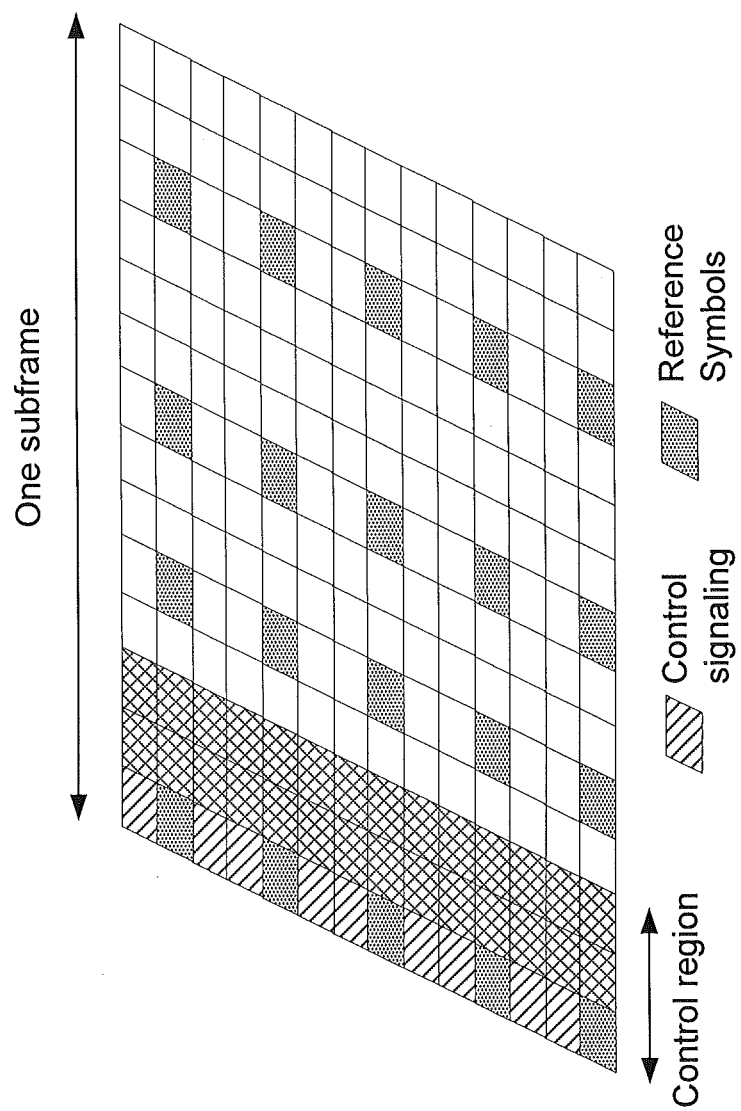
FIG. 1 is a schematic diagram showing an LTE subframe
Figure 2:
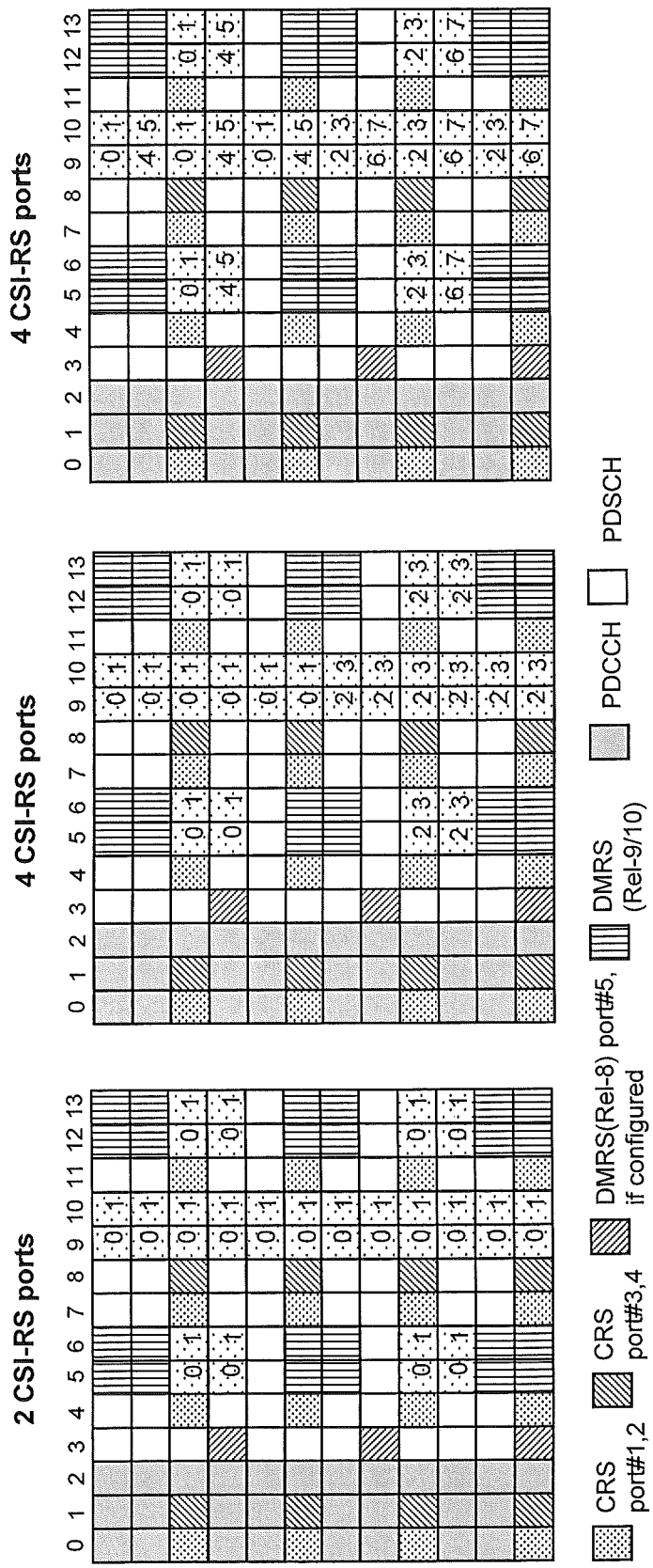
FIG. 2 is a schematic diagram showing reference signal patterns
Figure 3:
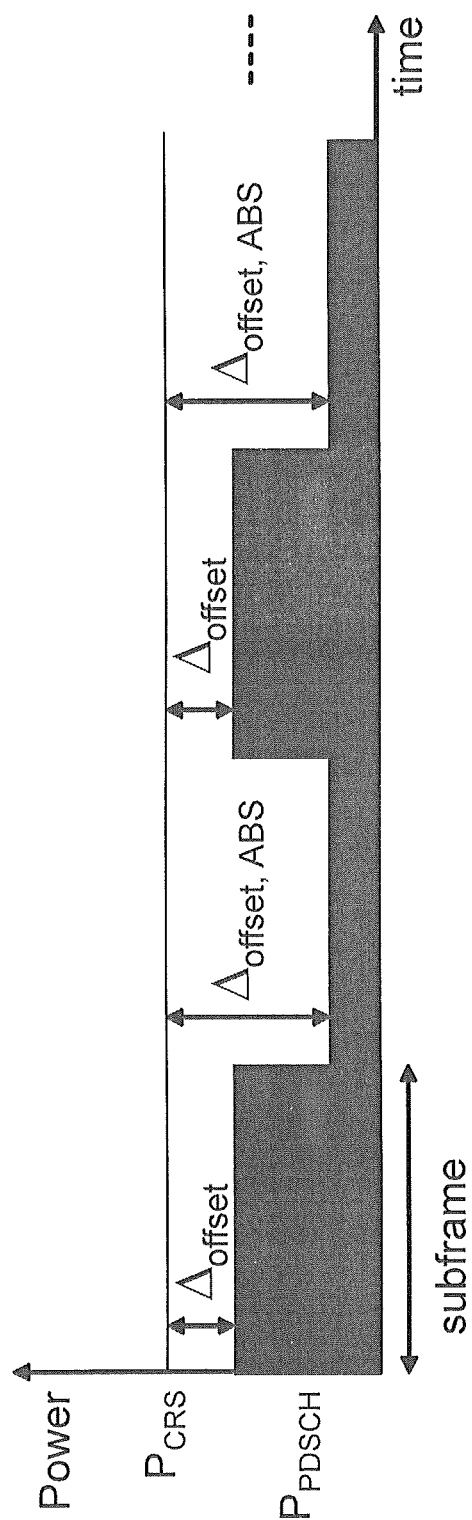
FIG. 3 is a schematic drawing illustrating power offsets
Figure 4:
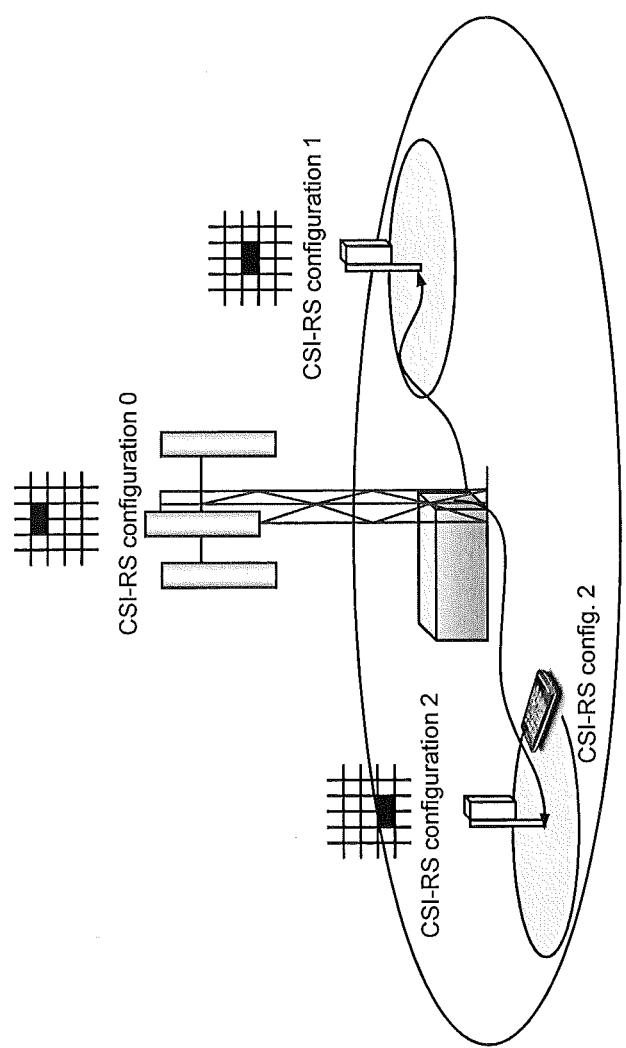
FIG. 4 is a schematic drawing illustrating an example wireless network

However, higher-layer signaling is slow, and reconfiguration of the subframe patterns may take tens of milliseconds. In certain scenarios, it may be beneficial to provide a faster and more flexible configuration mechanism. One example is in a CoMP HetNet scenario with RRU:s, as shown in FIG. 4, or in other scenarios relying on a fast backhaul. Because of the fast communication link between the RRU:s and the macro base station, it is possible to quickly adapt all the coordinated transmission points to a change in subframe configuration.

As mentioned above, user terminals located close to the center of the macro cell are good candidates for scheduling in an RPSF, since those terminals are likely to be able to receive even a lower-power data transmission. On the other hand, if the pico cell does not have any user terminals located at the cell-edge, where they may be interfered by the macro cell, or if the pico cell is currently not transmitting any data to its cell-edge users, then the macro eNB may safely transmit using full power in that subframe. The conditions in the network may in some cases change quickly, for example in case of rapidly moving user equipments (e.g. one or more UE:s moving toward the center of the macro cell).

To improve resource utilization e.g. in deployments with fast backhaul, particular embodiments described herein enable a macro eNB to select between transmitting a normal subframe, or an RPSF subframe, on a dynamic basis.

Figure 5:
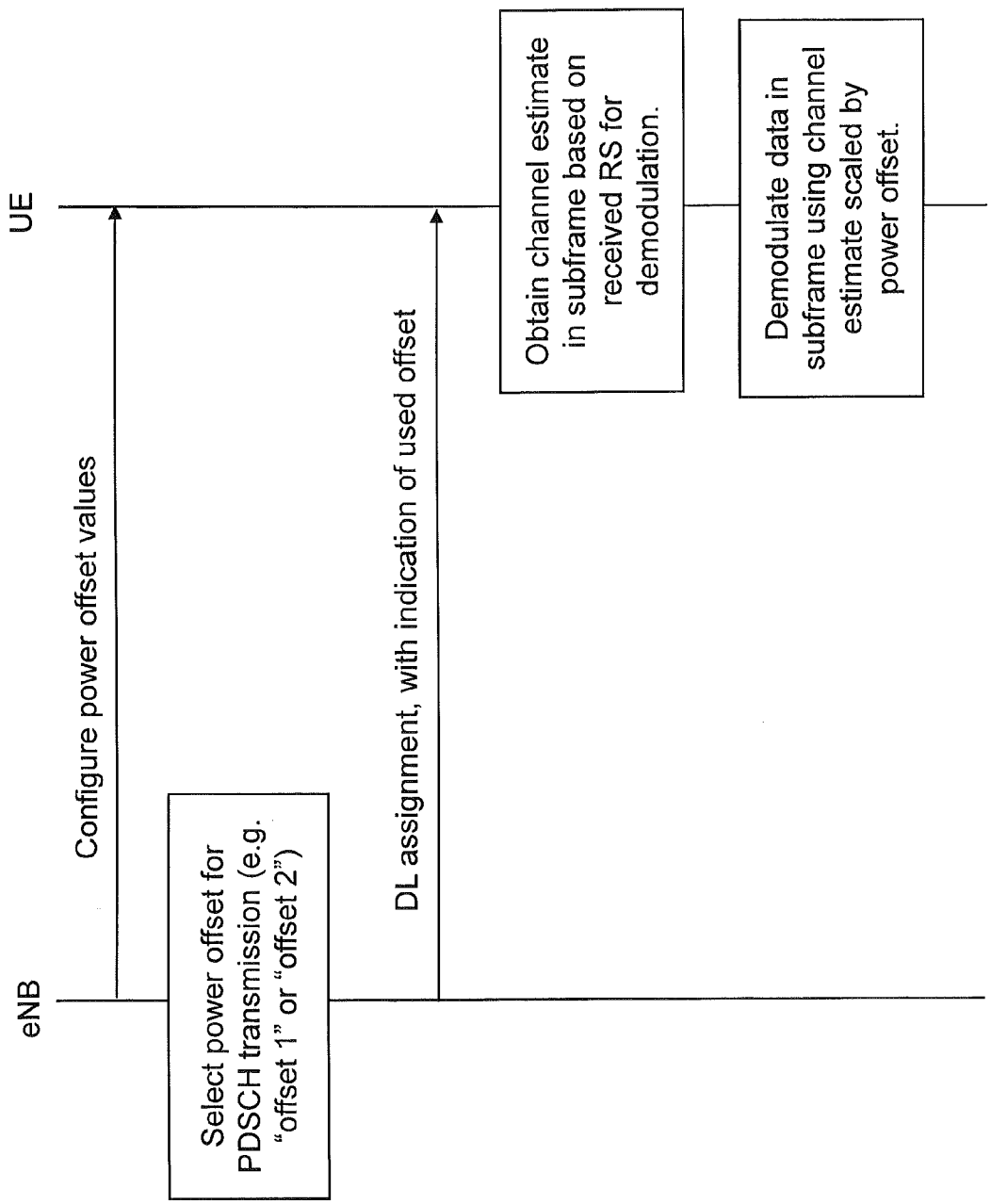
FIG. 5 is a combined signalling diagram and flowchart showing a method according to some embodiments

Referring to the combined signaling diagram and flowchart of FIG. 5, in some embodiments a network node, e.g. a macro eNB, dynamically signals to a UE which power offset, or EPRE ratio, to use for demodulation of a particular PDSCH transmission. This may be achieved by adding signaling in the downlink control information (DCI) format which is used to transmit the scheduling assignment to the UE. As a particular example, one bit may be added to the DCI format to indicate whether "offset 1" or "offset 2" is being used for the PDSCH associated with the DCI format. Another possibility is to utilize unused code points within the DCI format. As yet another alternative, a certain DCI format may be associated with offset 1, and another DCI format with offset 2, such that the selection of a DCI format implicitly communicates the offset. Here, "offset 1" corresponds to the EPRE ratio which is normally assumed for full power subframes, and "offset 2" corresponds to an EPRE ratio where PDSCH is transmitted with reduced power, i.e. a reduced power subframe. A further possibility is to use more than two different offset values, corresponding to different levels of power reduction. In this case, more than one bit may be used for the indication.

The downlink control information is encoded and transmitted via the PDCCH. Alternatively, it may be transmitted via an ePDCCH (enhanced or extended PDCCH) which is a control channel that is frequency-multiplexed with data, and where user-specific RS are used for demodulation.

The UE receives the downlink assignment and reads the indication of which power offset is being used. The UE then performs a channel estimate based on reference signals for demodulation received in the subframe, e.g. CRS or DM-RS. Based on the value of the bit, the UE will scale the channel estimate using the correct power offset, and use the scaled offset to demodulate the PDSCH.

It is noted that in the current version of the 3GPP standard, DM-RS are scaled in the same way as the data channel. Provided that this assumption holds, there would be no need to apply an offset when DM-RS are used for demodulation—or stated differently, an offset of 0 would always be applied. However, in principle it is also possible to use a different power for DM-RS than for data, e.g. for power boosting of the DM-RS for improved channel estimation. The concepts presented here are generally applicable to any type of reference signal for demodulation, where the transmit power for the RS is different from that used for data.

In a variant of this embodiment, the UE:s assumption on the power offset ratios is only applicable to modulations above QPSK, and in particular to 16QAM or 64QAM modulation. As explained above, in the case of QPSK power scaling of a corresponding reference constellation will not impact the closest Euclidean distance between a received data signal and a reference constellation point. In the case of e.g. 16QAM and 64QAM, the power scaling of corresponding reference constellations may have a considerably impact on which reference constellation point that is closest in Euclidean distance to the received data signal.

This solution enables dynamic signaling of the power offset per PDSCH transmission, instead of associating an offset with a predetermined subset of subframes. In other words, there is no need for configuration or reconfiguration of subframe patterns. As the dynamic signaling disclosed here happens on a subframe basis (i.e. 1 ms) it is significantly faster than higher-layer signaling, which may take tens of milliseconds. Therefore, the disclosed method makes it possible for the network node to adapt much more quickly to changes in the cell or in neighboring cells, e.g. rapid movement of UE:s or sudden changes in cell load. This enables a more efficient use of radio resources.

The value of "offset 1", i.e. the offset for normal subframes, may be configured in the conventional way, e.g. by higher-layer signaling of the UE-specific parameter $P_A$ and the cell-specific parameter $P_B$ from which the offset may be derived depending on the OFDM symbol index, as described in 3GPP TS 36.213 v10.3.0, section 5.2. However, it should be noted that it is also possible to signal the absolute value of the power offset, or any parameter from which the power offset can be derived.

The value of "offset 2", i.e. the offset for RPSF subframes, may be represented as a delta value relative to offset 1, or as an absolute offset. The delta value or absolute offset may be predefined e.g. in a standard, or configured by higher-layer signaling similarly as described for offset 1 above. In one particular variant, offset 2 is signalled by using additional $P_A$ and $P_B$ parameters. Offset 2 may also be determined based on the cell selection offset (CSO) value, for instance by setting offset 2=offset 1—CSO. In this case, CSO may be signalled to the UE, allowing it to derive offset 2.

If more than two offsets are configured, the remaining offsets may be represented and signalled in a similar way.

A further possibility is to signal the actual offset value, or one or more parameters from which the offset may be derived, directly in the DCI instead of using one or more bits to indicate one of a number of preconfigured offsets. The offset may be signalled as an absolute value, or as a delta value in relation to the reference signal EPRE. For example, the parameters $P_A$ and/or $P_B$ may be added to the DCI. This variant would entail a higher overhead, but at the same time provide even further flexibility in terms of setting the offset value. In particular variants, the network node schedules only a single user in the subframe. Stated differently, all transmission power available for data transmission in the subframe is allocated to a single wireless terminal.

It is further noted that the disclosed solution determines, and indicates, a power offset per PDSCH.

In some embodiments, the method described above may be extended by dynamically switching between two different DCI formats. One of the formats comprises an indication of a power offset used in the associated PDSCH, as described above in connection with FIG. 5. The other format, referred to as the "second format" below, does not provide such an indication. Instead, when the second format is used, the power offset is determined based on a semi-statically configured subframe pattern of power offsets. As explained above, different subframe patterns, or subframe subsets, may be configured for normal subframes and RPSF, respectively, and each of these subsets may be associated with a power offset, e.g. with one of the configure power offset values. The association may be predefined or indicated via higher layer signaling. If the second DCI format is used, the UE applies the power offset which is associated with the subframe subset that the current subframe belongs to.

Thus, the network node may dynamically switch between scheduling a PDSCH using either of the two DCI formats. As a particular example, DCI format 1 may be extended to provide the indication, while DCI format 1A, which is a format for fall-back operation, does not provide the indication.

More than two formats may be available, where at least one format provides an indication of a power offset, and at least one format does not provide such an indication. Possibly, different formats may provide the indication in different ways. For example, one format may employ single bit for the indication, indicating one of two possible offsets. A second format may employ two or more bits, allowing a selection between several offset values. Alternatively, the second format may indicate the offset value directly, e.g. by signaling the parameters $P_A$ and $P_B$.

An advantage of this embodiment is that the additional overhead from adding the indication does not have to be present, at least not to the same extent, in all DCI formats. This may be particularly beneficial for fall-back DCI formats, which are generally designed to be size-efficient.

In one embodiment, offsets for CSI feedback are semi-statically configured, and associated with configured subframe patterns. The network node configures an UE with two power offset values, "offset 1" and "offset 2", which correspond to the power offset used for normal subframes and for RPSF, respectively. The network node also configures the UE with two subframe patterns, i.e. two subsets of subframes, which the UE shall use to derive CSI feedback reports. One pattern is associated with offset 1, and the other pattern is associated with offset 2. The patterns may be used for both periodic and aperiodic CSI reports.

The power offsets and subframe patterns are configured using higher-level signaling, e.g. RRC messages. The power offsets may be configured in the conventional way as described above and in TS 36.213, v 10.3.0, sections 5.2, 7.2.3 and 7.3.

The CSI feedback may be based on CRS, CSI-RS, or any other suitable reference signal present in the subframe.

The received power on the reference symbol (e.g. CRS or CSI-RS) that the UE is measuring on is used for deriving the channel quality indicator (CQI), the precoding matrix index (PMI) and the rank indicator (RI), all of which are included in the CSI report. However, this power needs to be scaled to be representative of the received PDSCH. Thus, when the UE performs a CSI measurement in a subframe, the UE determines which subframe subset, i.e. pattern, this subframe belongs to. The UE then assumes the power offset which is associated with that pattern, and uses this power offset to scale the received power in order to derive the CSI report.

The CSI report is then transmitted to the network node, e.g. eNB.

This embodiment may be combined with one or more of the embodiments described above. Thus, semi-statically configured offsets and subframe patterns may be used for CSI feedback, whereas dynamic signaling of an offset in the control information is applied for demodulation purposes. Additionally, dynamic switching between DCI formats may be applied, as explained above.

As mentioned above, the offset values to apply may be configured separately in some embodiments, e.g. using RRC signaling from the eNB to the UE.

An example method in a network node, e.g. a base station (BS), for calculating and configuring the offset values will now be described.

1. The base station (BS) decides on using power levels $P_{RS}$ for reference signals, $P_{normal}$ for PDSCH in normal subframes and $P_{RPSF}$ for PDSCH in RPSF.
2. BS calculates $\text{offset}_{normal} = P_{normal}/P_{RS}$ and $\text{offset}_{RPSF} = P_{RS}$
3. BS signals $\text{offset}_{normal}$ and $\text{offset}_{RPSF}$, or values from which the offsets may be derived, to UE, e.g. by RRC signalling.
4. Optionally, the BS also signals two subframe patterns to the UE, one corresponding to normal subframes and one pattern corresponding to RPSF.

An example method in a wireless terminal, e.g. an UE, for receiving and applying the configured offsets is described below.

1. UE receives $\text{offset}_{normal}$ and $\text{offset}_{RPSF}$, or values from which the offsets may be derived. In the latter case, the UE also derives the offsets from the received values.
2. UE applies $\text{offset}_{normal}$ for demodulation when control information indicates a first offset value (e.g. if the additional bit in the DCI is set to "0" indicating that this is a normal subframe).
3. UE applies $\text{offset}_{RPSF}$ for demodulation when control information indicates a second offset value (e.g. if the additional bit in the DCI is set to "1" indicating that this is a RPSF subframe).
4. Optionally, for CSI reporting, the UE applies either $\text{offset}_{normal}$ or $\text{offset}_{RPSF}$ for deriving the CSI report, depending on which subframe pattern the subframe belongs to.

It is pointed out that if a logarithmic power scale is used, the offset may be defined in terms of a difference between the first and second power levels. If a linear scale is used, the offset may instead be defined as a ratio between the power levels. Generally speaking, the offset represents a relationship between the first and second power levels.

The offsets may also be calculated using energy relations. In this case if PDSCH $\text{EPRE}_{normal}$ and PDSCH $\text{EPRE}_{RPSF}$ are the transmitted Energies Per Resource Element (EPRE) for PDSCH in a normal subframe and in an RPSF respectively, and RS EPRE is the transmitted Energy per Resource Element in a reference symbols, the offsets can be calculated as $\text{offset}_{normal}$=PDSCH EPRE/RS EPRE, and $\text{offset}_{RPSF}$=PDSCH $\text{EPRE}_{RPSF}$/RS EPRE.

Figures 6, 7:
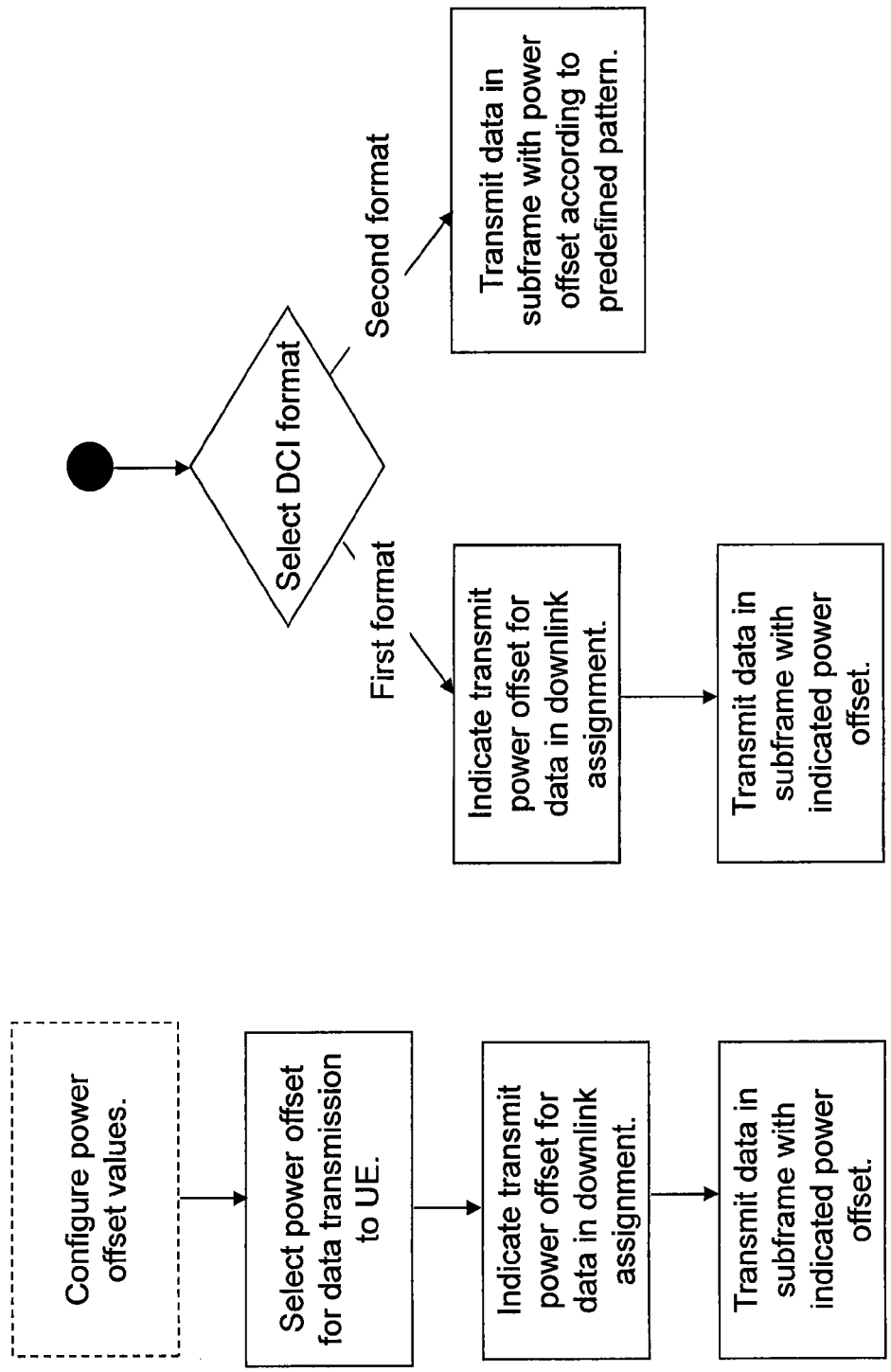
FIG. 6 is a flowchart showing a method according to some embodiments
FIG. 7 is a flowchart showing a method according to some embodiments

A method in a network node, e.g. an eNB, according to some embodiments will now be described with reference to FIG. 6. The eNB communicates with a wireless terminal, e.g. a user equipment.

In an optional step, the network node configures the wireless terminal with power offset values to use for normal subframes and RPSF, respectively.

The network node selects a power offset to be used for transmission of data to a wireless terminal, relative to reference signal transmission, in a subframe. In a particular variant, the network node selects between two power offsets, where one offset corresponds to a normal subframe and the other offset corresponds to an RPSF. Stated differently, the network node determines whether to transmit data with full power or with reduced power in the subframe.

The power offset selection may be based on current conditions in the cell and/or neighboring cells. As one example, if the UE is located close to the eNB and a neighboring pico cell is likely to be interfered by the transmission, the network node may choose to transmit using reduced power. As another example, if a neighboring pico cell is currently not expected to be interfered by the eNB, e.g. due to the locations of pico UEs or because of temporary low activity in the pico cell, the network node may choose to transmit using full power, i.e. use a normal subframe. Thus, in general the decision may be made based on several different factors such as the location of UE:s, the current load in the respective cell, and which UE:s are being scheduled in a particular subframe in the different cells. The selected power offset may also depend on the cell selection offset which is currently being applied to extend the range of the pico cell. Typically, the power offset would be selected such that it is linearly proportional to the cell selection offset, in dB scale.

The network then transmits control information comprising a downlink scheduling assignment to the wireless terminal, e.g. user equipment, in the subframe. The control information further comprises an indication of the selected power offset.

As a particular example, the indication is provided by setting one bit in the control information. For example, the bit may be set to 0 if the first offset is used (i.e. this is a normal subframe), and set to 1 if the second offset is used (i.e. an RPSF). It is also possible to use more than one bit to indicate one of several offset values, which may correspond to different levels of power reduction. The offset values may have been configured in a previous step. Alternatively, it is possible to indicate the offset value directly in the DCI.

The network node then transmits the data in the subframe using the indicated power offset. In a particular variant, the network node only transmits data to one wireless terminal in the subframe. In other words, in this variant all the data transmission power is allocated to a single wireless terminal.

A variation of the above method will now be described, with reference to FIG. 7.

The network node first selects a downlink control information format out of at least two downlink control information formats. A first format provides an indication of a power offset for data transmission, but a second format does not provide such an indication.

The selection may for example be based on whether the network node needs to perform a fallback transmission. If this is the case, the second format is used, otherwise, the first format is used.

When the network node selects the first downlink control information format, the network node transmits control information comprising an indication of a transmit power offset, and transmits data using that offset, as was described for the previous embodiment.

However, when the network node selects the second format, the network node transmits control information without indicating the power offset for data. The network node transmits data in the subframe with a transmit power offset according to a predefined pattern. That is to say, it is assumed that the network node has previously configured two or more subframe patterns, or subframe subsets, each of which has been associated with an offset. Depending on which subset the current subframe belongs to, the network node will apply the applicable offset.

Figure 8:
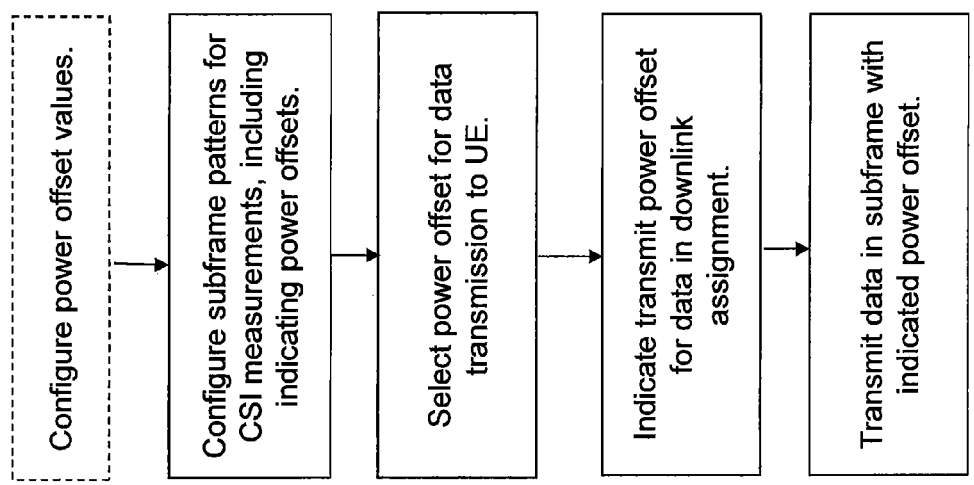
FIG. 8 is a flowchart showing a method according to some embodiments

A further method according to some embodiments will now be described, with reference to FIG. 8. This method is based on the one described in connection with FIG. 6. However, the present embodiment additionally configures subframe subsets for CSI measurements, and associates these with different offsets.

Optionally, the network node configures power offset values for normal subframes and RPSF, as described above.

The network node configures a first subframe subset for channel state information measurements. This first subset is associated with a power offset for data transmission, for example with the configured offset for normal subframes as described above. In a variant, an indication of the power offset to be associated with the first subset is sent to the wireless terminal.

The network node also configures a second subframe subset for channel state information measurements. The second subset is associated with a second power offset for data transmission, for example with the configured offset for RPSF as described above. In a variant, an indication of the power offset to be associated with the second subset is sent to the wireless terminal.

The network node then performs the further steps of described in connection with FIG. 6.

Figure 9:
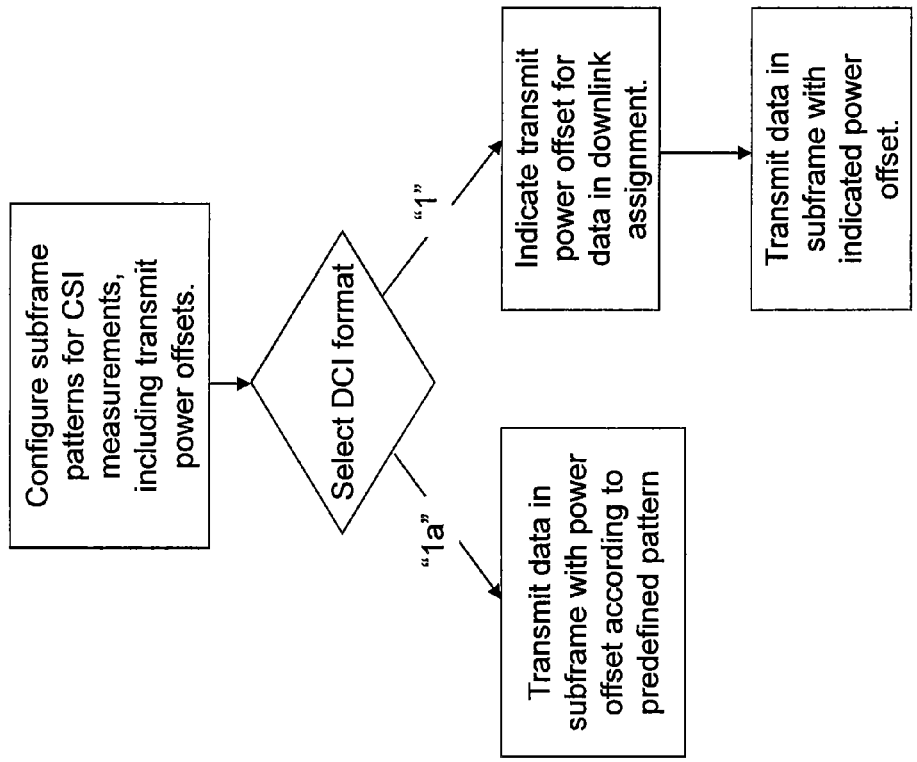
FIG. 9 is a flowchart showing a method according to some embodiments

This embodiment may also be combined with the one described in connection with FIG. 7, as shown in FIG. 9.

A method in a wireless terminal, e.g. a user equipment, will now be described with reference to FIG. 10.

In an optional step, the wireless terminal receives power offset values to use for normal subframes and RPSF, respectively.

The wireless terminal receives control information in a subframe, comprising a downlink assignment for that subframe. The control information further comprises an indication of a transmit power offset that will be used for data in the subframe.

The wireless terminal then demodulates data received in the subframe according to the downlink assignment, by means of the indicated transmit power offset. More specifically, the demodulation step may comprise obtaining a channel estimate, based on at least one demodulation reference signal received in the subframe. The wireless terminal then demodulates the data by means of the channel estimate, wherein the channel estimate is scaled according to the power offset.

Figure 11:
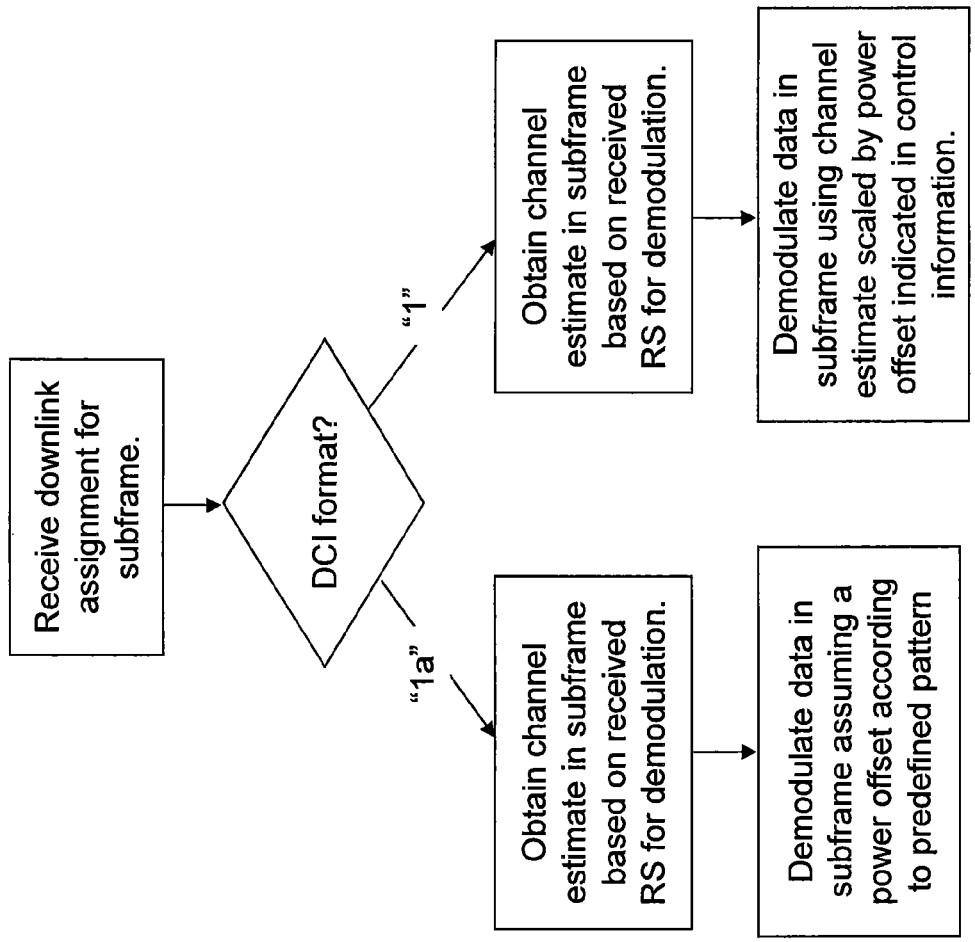
FIG. 11 is a flowchart showing a method according to some embodiments

A variant of this embodiment is shown in FIG. 11. In this variant, the terminal decides which offset to use based on the DCI format.

If a first format is used, e.g. format 1A, the wireless terminal assumes a power offset according to a predefined subframe pattern or subset. That is to say, if the current subframe is part of a first subframe pattern, a first offset is applied, and if the subframe is part of a second subframe pattern, a second offset is applied.

Figure 10:
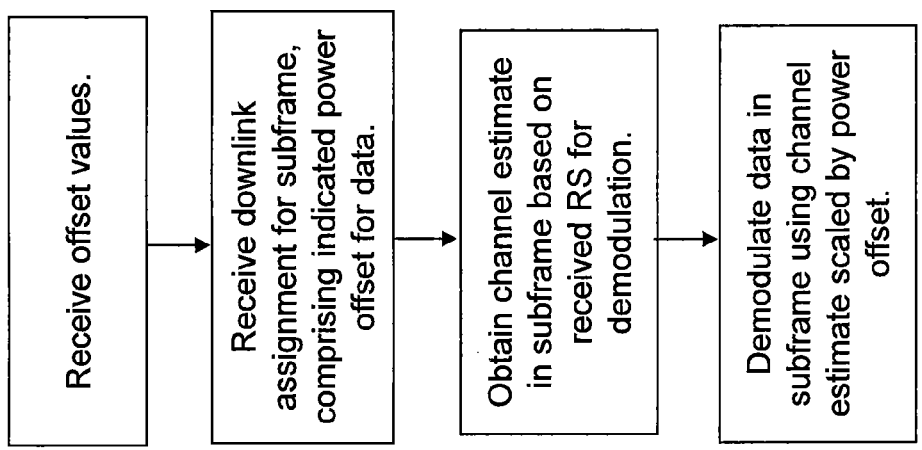
FIG. 10 is a flowchart showing a method according to some embodiments

If a second format is used, e.g. format 1, the wireless terminal applies the offset indicated in the DCI, similarly to the embodiment of FIG. 10.

A further method in a wireless terminal according to some embodiments will now be described, with reference to FIG. 12. This method is based on the one described in connection with FIG. 10.

In an optional step, the terminal receives power offset values, e.g. one offset value for normal subframes and one offset value for RPSF, as described above.

In this embodiment, the wireless terminal receives subframe subsets for CSI measurements, where each subset is associated with a power offset.

The wireless terminal receives a first subframe subset for channel state information measurements. The first subset is associated with a power offset for data transmission, for example with the configured offset for normal subframes as described above. This association may be predefined. In a variant, an indication of the power offset to be associated with the first subset is received by the user equipment. This indication may be an index indicating one of the power offset values configured in the previous step. Alternatively, the power offset value for each subset may be indicated e.g. in the form of P_A and P_B parameters. As yet another alternative, the offset values to use may be predefined, e.g. in a standard, or derivable from another parameter or set of parameters which are already available to the user terminal.

The wireless terminal also receives a second subframe subset for channel state information measurements. The second subset is associated with a second power offset for data transmission, for example with the configured offset for RPSF as described above. The association between the subset and the offset may be provided in any of the ways mentioned above for the first subset. In a particular variant, more than two subsets may be received, each associated with a power offset.

When performing a periodic CSI measurement, or when the wireless terminal receives a request for an aperiodic CSI report, the terminal performs a CSI measurement based on the received subframe subsets. As described above, the estimated channel strength based on the reference signals (e.g. CRS or CSI-RS) need to be scaled by the applied offset, in order to provide accurate CSI feedback. Thus, if the subframe for which the measurement is performed is comprised in the first subset, the wireless terminal scales the estimated channel strength according to the offset associated with the first subset. If the subframe for which the measurement is performed is comprised in the second subset, the wireless terminal scales the estimated channel strength according to the offset associated with the second subset.

When the wireless terminal receives a downlink assignment comprising an indication of a power offset, the wireless terminal demodulates data in the subframe using the indicated offset, in the same way as has been described in connection with FIG. 10.

Thus, in this embodiment, the configured subframe patterns or subsets, with their associated offsets, are used for CSI measurements. For data demodulation, the offset indicated in the downlink control information is applied.

Figures 12, 13:
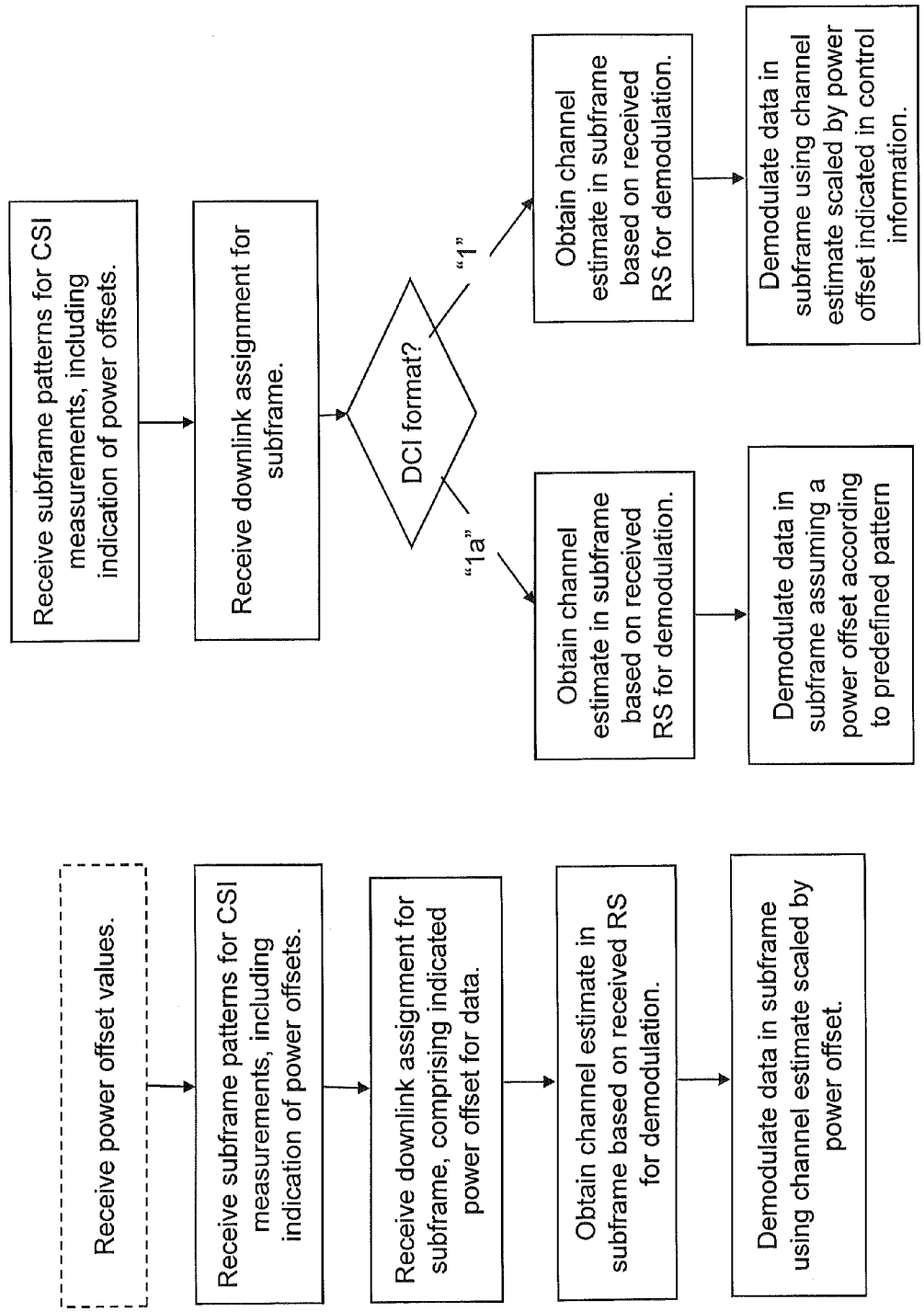
FIG. 12 is a flowchart showing a method according to some embodiments
FIG. 13 is a flowchart showing a method according to some embodiments

This embodiment may also be combined with the one described in connection with FIG. 11, as shown in FIG. 13.

Although the described solutions may be implemented in any appropriate type of telecommunication system supporting any suitable communication standards and using any suitable components, particular embodiments of the described solutions may be implemented in an LTE network, such as that illustrated in FIG. 4.

The example network may further include any additional elements suitable to support communication between wireless devices or between a wireless device and another communication device (such as a landline telephone). Although the illustrated wireless device may represent a communication device that includes any suitable combination of hardware and/or software, this wireless device may, in particular embodiments, represent a device such as the example wireless terminal 1500 illustrated in greater detail by FIG. 15. Similarly, although the illustrated network nodes may represent network nodes that includes any suitable combination of hardware and/or software, these network nodes may, in particular embodiments, represent devices such as the example network node 1400 illustrated in greater detail by FIG. 14.

Figure 15:
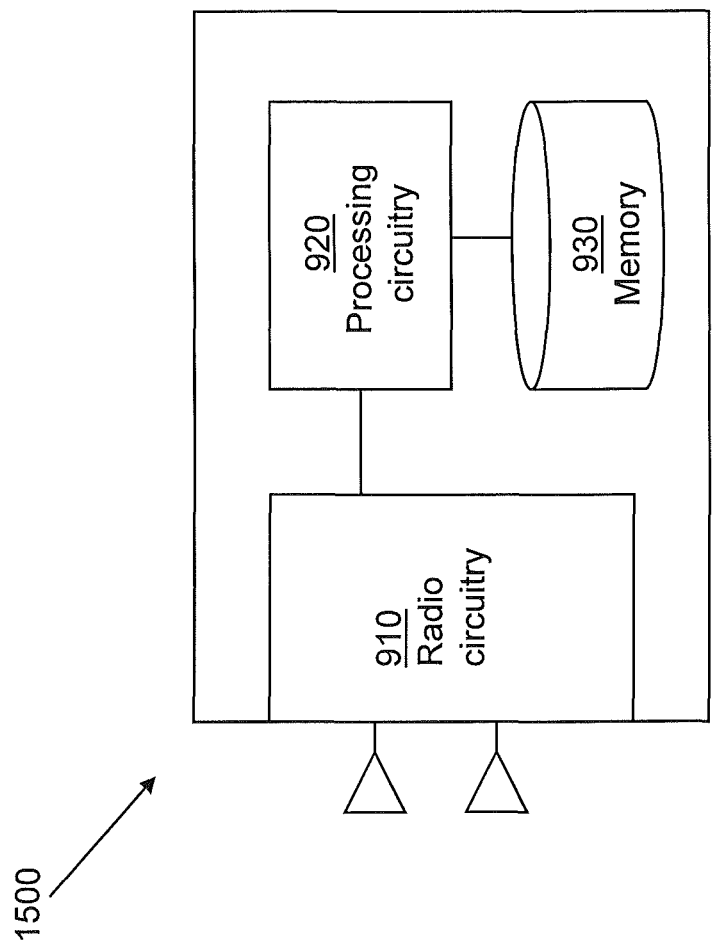
FIG. 15 is a block diagram illustrating an example wireless device according to some embodiments

As shown in FIG. 15, the example wireless terminal 1500 includes processing circuitry 1520, a memory 1530, radio circuitry 1510, and at least one antenna. The radio circuitry may comprise RF circuitry and baseband processing circuitry (not shown). In particular embodiments, some or all of the functionality described above as being provided by mobile communication devices or other forms of wireless device may be provided by the processing circuitry 1520 executing instructions stored on a computer-readable medium, such as the memory 1530 shown in FIG. 15. Alternative embodiments of the wireless terminal 1500 may include additional components beyond those shown in FIG. 15 that may be responsible for providing certain aspects of the wireless device's functionality, including any of the functionality described above and/or any functionality necessary to support the solution described above.

Figure 14:
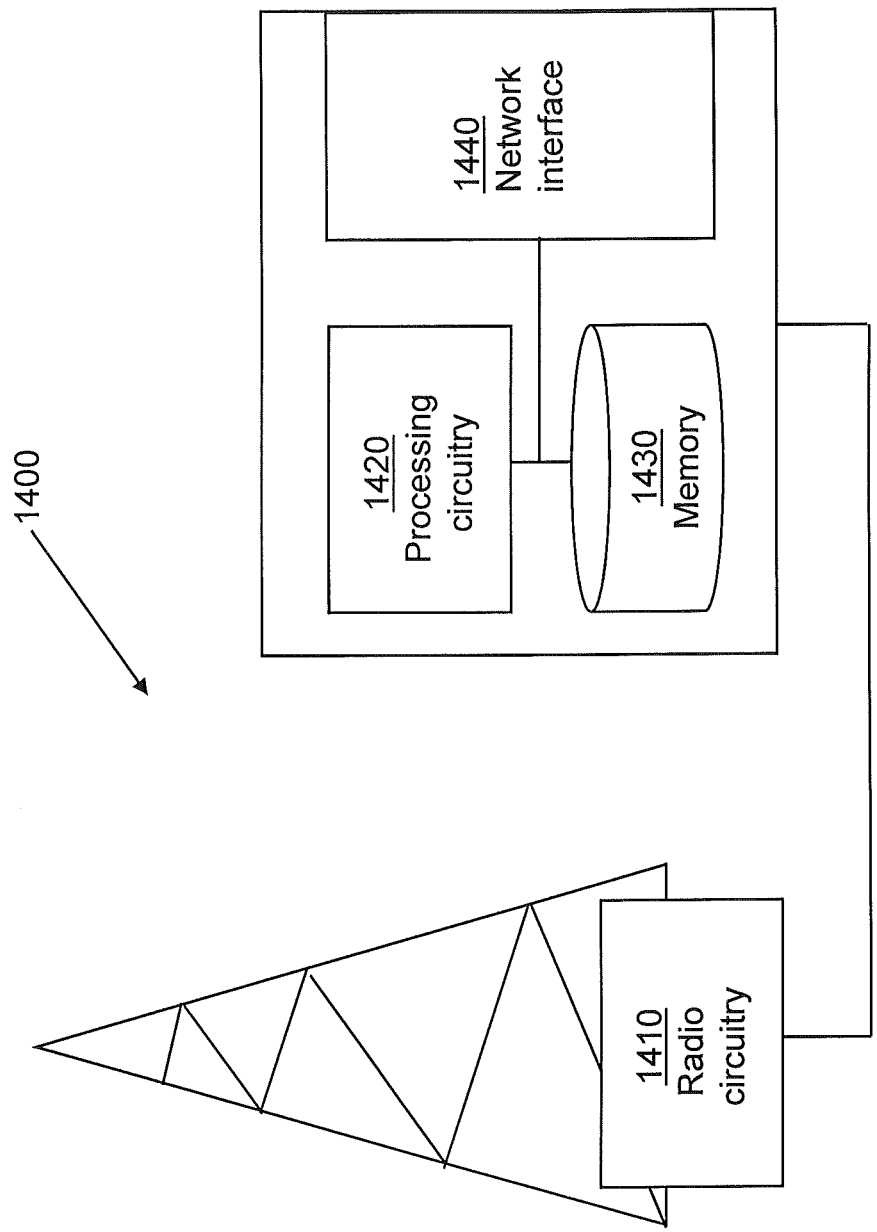
FIG. 14 is a block diagram illustrating an example network node according to some embodiments

As shown in FIG. 14, the example network node 1400 includes processing circuitry 1420, a memory 1430, radio circuitry 1410, and at least one antenna. The processing circuitry 1420 may comprise RF circuitry and baseband processing circuitry (not shown). In particular embodiments, some or all of the functionality described above as being provided by a mobile base station, a base station controller, a relay node, a NodeB, an enhanced NodeB, and/or any other type of mobile communications node may be provided by the processing circuitry 1420 executing instructions stored on a computer-readable medium, such as the memory 1430 shown in FIG. 14. Alternative embodiments of the network node 1400 may include additional components responsible for providing additional functionality, including any of the functionality identified above and/or any functionality necessary to support the solution described above.

It should be noted that although terminology from 3GPP LTE has been used in this disclosure to exemplify the invention, this should not be seen as limiting the scope of the invention to only the aforementioned system. Other wireless systems, including WCDMA, WiMax, UMB and GSM, may also benefit from exploiting the ideas covered within this disclosure.

Whenever examples herein refer to an eNB or base station (BS), it should be understood that the concepts presented apply equally to any network node, e.g. a pico base station. Similarly, the term user equipment (UE) should not be construed as limiting, and the described methods may be implemented in any wireless terminal.

In the examples set forth above, it has been assumed that the transmit power for reference signals (RS) is the same for normal subframes and for RPSF. However, the same concepts apply in a similar way even if different RS transmit power levels are used.

Throughout this application, when the term "cell selection offset" is used this shall be construed as encompassing not only an offset used in idle mode cell selection/reselection but also a handover bias.

When using the word "comprise" or "comprising" it shall be interpreted as non-limiting, i.e. meaning "consist at least of".

The invention claimed is:

1. A method in a network node, the method comprising:
configuring a wireless terminal with at least two power offset values, wherein at least one of the at least two power offset values is based on a cell selection offset which is applied to extend the range of a neighboring cell interfered by the network node; and
transmitting a downlink scheduling assignment for a subframe to a wireless terminal, wherein the downlink scheduling assignment is comprised in control information, and wherein the control information further comprises an indication of which one of the power offset values is used or will be used for data transmission in the subframe relative to reference signal transmission,
wherein transmitting the downlink scheduling assignment comprises setting one bit in the control information as the indication.

2. The method of claim 1, wherein a first one of the power offset values is for use in fall-power subframes, and a second one of the power offset values is for use in reduced-power subframes.

3. The method of claim 1, where the power offset value which is based on the cell selection offset is proportional to the cell selection offset value.

4. The method of claim 1, further comprising transmitting data in the subframe using the indicated power offset value.

5. The method of claim 1, further comprising selecting one of the power offset values to use for transmission of data to the wireless terminal.

6. A method in a network node, the method comprising:
configuring a wireless terminal with at least two power offset values, wherein at least one of the at least two power offset values is based on a cell selection offset which is applied to extend the range of a neighboring cell interfered by the network node;
selecting a downlink control information format out of at least two downlink control information formats;
responsive to selecting a first one of the downlink control information formats, transmitting control information comprising an indication of a transmit power offset value that will be used for data in the subframe, and transmitting data in the subframe with the indicated transmit power offset value; and
responsive to selecting a second one of the downlink control information formats, transmitting control information without an indication of a transmit power offset value, and transmitting data in the subframe with a transmit power offset value according to a defined pattern, the defined pattern comprising a first subframe subset corresponding to a first one of the at least two power offset values and a second subframe subset corresponding to a second one of the at least two power offset values,
wherein the control information comprises a downlink scheduling assignment for a subframe to a wireless terminal and an indication of which one of the power offset values is used or will be used for data transmission in the subframe relative to reference signal transmission.

7. The method of claim 1, further comprising:
configuring a first subframe subset for channel state information measurements, comprising signaling an indication to the wireless terminal of a first transmit power offset value of the at least two power offset values used for transmitting data in the subframes comprised in the first subframe subset, and configuring a second subframe subset for channel state information measurements, comprising signaling an indication to the wireless terminal of a second transmit power offset value of the at least two power offset values used for transmitting data in the subframes comprised in the second subframe subset.

8. The method of claim 7, wherein the second transmit power offset value is different from the first transmit power offset value.

9. The method of claim 1, wherein configuring the wireless terminal with the at least two power offset values comprises:
signaling a first parameter from which a first one of the at least two power offset values is derivable.

10. The method of claim 9, wherein configuring the wireless terminal with the at least two power offset values further comprises:
signaling a second parameter from which a second one of the at least two power offset values is derivable.

11. A method in a wireless terminal, the method comprising:
receiving at least two power offset values, or information from which the at least two power offset values can be derived;
receiving a downlink assignment for a subframe, wherein the downlink assignment is comprised in control information;
responsive to the control information comprising a first format, applying a power offset corresponding to a power offset value of the at least two power offset values indicated in the control information;
responsive to the control information comprising a second format, applying a power offset corresponding to a power offset value of the at least two power offset values according to a defined pattern, the defined pattern comprising a first subframe subset corresponding to a first one of the at least two power offset values and a second subframe subset corresponding to a second one of the at least two power offset values; and
demodulating data received in the subframe using the applied transmit power offset value.

12. The method of claim 11, wherein the step of demodulating data further comprises:
a channel estimate based on at least one demodulation reference signal received in the subframe; and
demodulating the data using the channel estimate, wherein the channel estimate is scaled according to the applied power offset value.

13. A wireless terminal comprising radio circuitry and processing circuitry, wherein the processing circuitry is configured to:
receive, via the radio circuitry, at least two power offset values, or information from which the at least two power offset values can be derived;
receive, via the radio circuitry, a downlink assignment for a subframe, wherein the downlink assignment is comprised in control information;
responsive to the control information comprising a first format, apply a power offset corresponding to a power offset value of the at least two power offset values indicated in the control information;
responsive to the control information comprising a second format, apply a power offset corresponding to a power offset value of the at least two power offset values according to a defined pattern, the defined pattern comprising a first subframe subset corresponding to a first one of the at least two power offset values and a second subframe subset corresponding to a second one of the at least two power offset values; and
demodulate data received in the subframe using the applied transmit power offset value.

14. The method of claim 1, wherein configuring the wireless terminal with the at least two power offset values comprises signaling, from the network node to the wireless terminal, a first UE-specific parameter and a first cell-specific parameter that define a first one of the at least two power offset values.

15. The method of claim 14, wherein configuring the wireless terminal with the at least two power offset values further comprises signaling, from the network node to the wireless terminal, a second UE-specific parameter and a second cell-specific parameter that define a second one of the at least two power offset values.

16. The method of claim 14, wherein configuring the wireless terminal with the at least two power offset values further comprises signaling a delta value, relative to the first one of the power offset values, that defines a second one of the at least two power offset values.

17. The method of claim 1, wherein ones of the at least two power offset values correspond to a difference of a respective energy per resource element of data transmission to an energy per resource element of reference signal transmission.

18. The method of claim 11, wherein at least one of the at least two power offset values is based on a cell selection offset which is applied to extend the range of a neighboring cell interfered by a network node.

19. The method of claim 18, wherein the at least one power offset value which is based on the cell selection offset is proportional to the cell selection offset value.

* * * * *